US010500797B2

(12) United States Patent
Loo et al.

(10) Patent No.: US 10,500,797 B2
(45) Date of Patent: Dec. 10, 2019

(54) TEXTURED POLYMERIC MATERIALS, AND METHODS OF FORMING

(71) Applicant: Ansell Limited, Richmond, Victoria (AU)

(72) Inventors: Liong Yu Loo, Selangor (MY); Kwee Feng Hin, Selangor (MY); Karunagaran Arumugam, Selangor (MY); Chamila Jayasundara, Kegalle (LK)

(73) Assignee: Ansell Limited, Richmond, Victoria (AU)

( * ) Notice: Subject to any disclaimer, the term of this patent is extended or adjusted under 35 U.S.C. 154(b) by 93 days.

(21) Appl. No.: 15/066,236

(22) Filed: Mar. 10, 2016

(65) Prior Publication Data

US 2016/0263788 A1    Sep. 15, 2016

Related U.S. Application Data

(60) Provisional application No. 62/131,335, filed on Mar. 11, 2015.

(51) Int. Cl.
*B29C 67/20* (2006.01)
*B29C 41/14* (2006.01)
(Continued)

(52) U.S. Cl.
CPC ............. *B29C 67/20* (2013.01); *B29C 41/14* (2013.01); *B29K 2105/046* (2013.01); *B29K 2715/00* (2013.01); *B29L 2031/4864* (2013.01)

(58) Field of Classification Search
CPC ........ B29C 67/20; B29C 67/202; B29C 44/12
(Continued)

(56) References Cited

U.S. PATENT DOCUMENTS

| 3,180,914 A | 4/1965 | Maltenfort |
| 4,283,244 A | 8/1981 | Hashmi |

(Continued)

FOREIGN PATENT DOCUMENTS

| EP | 1608808 A1 | 12/2005 |
| EP | 2181826 A1 | 5/2010 |

(Continued)

OTHER PUBLICATIONS

Alan Cooper, Biophysical Chemistry, RSC Publishing, 2nd Edition, p. 17. (Year: 2011).*

(Continued)

*Primary Examiner* — Robert C Dye
*Assistant Examiner* — Sedef E Paquette
(74) *Attorney, Agent, or Firm* — Moser Taboada (57) ABSTRACT

Provided for example is a method of forming texture comprising: (I) providing a polymeric layer with first and second sides, wherein the polymeric layer is made from a polymeric material that gels on contact with a gelling agent, and wherein the first side is gelled, with gelling extending into the polymeric layer but not to the second side; (II) contacting the second side of the polymeric layer with a foamy aqueous solution of surfactant (one or more), the aqueous foam being in the process of collapsing during the contacting, wherein the aqueous solution of surfactant is effective to gel the polymeric material; (III) applying a aqueous medium to the second surface with sufficient force or agitation so as to remove a portion of the polymeric material; and (IV) curing the remaining polymeric material without, following the contacting step, further contacting the polymer layer with a gelling component.

10 Claims, 6 Drawing Sheets

(51) Int. Cl.
   *B29L 31/48* (2006.01)
   *B29K 105/04* (2006.01)
(58) Field of Classification Search
   USPC ............. 264/45.1; 427/246; 128/844; 2/159, 2/161.7, 161.8, 168
   See application file for complete search history.

(56) References Cited

U.S. PATENT DOCUMENTS

| | | |
|---|---|---|
| 4,569,707 A | 2/1986 | Johnson |
| 6,081,928 A | 7/2000 | Bourne |
| 6,526,593 B2 | 3/2003 | Sajovic |
| 6,675,392 B2 | 1/2004 | Albert |
| 6,745,403 B2 | 6/2004 | Sajovic |
| 7,771,644 B2 | 8/2010 | Flather et al. |
| 8,119,200 B2 | 2/2012 | Kassam et al. |
| 2004/0221364 A1 | 11/2004 | Dillard et al. |
| 2006/0143767 A1 | 7/2006 | Yang et al. |
| 2007/0118967 A1 | 5/2007 | Flather et al. |
| 2007/0136926 A1 | 6/2007 | Johnson et al. |
| 2007/0204381 A1 | 9/2007 | Thompson et al. |
| 2011/0041236 A1 | 2/2011 | Higuchi |
| 2013/0291283 A1* | 11/2013 | Hassan ............. A41D 19/0058 2/167 |
| 2015/0082508 A1* | 3/2015 | Taylor ................... B29C 41/14 2/69 |

FOREIGN PATENT DOCUMENTS

| | | |
|---|---|---|
| WO | WO-2005088005 A1 | 9/2005 |
| WO | WO-2012149172 A1 | 11/2012 |

OTHER PUBLICATIONS

Krister Holmberg, Handbook of Applied Surface and Colloid Chemistry, John Wiley & Sons, vol. 1-2, p. 25. (Year: 2002).*
I. Johansson, Handbook for Cleaning / Decontamination of Surfaces, vol. 1, Ch. B.1.I., Section 5.1.1., pp. 73-74. (Year: 2007).*
International Search Report and Written Opinion dated Jun. 15, 2016 for PCT Application No. PCT/AU2016/000075.
Supplementary European Search Report dated Sep. 25, 2018 for Application No. EP16760912.

* cited by examiner

TEXTURED POLYMERIC MATERIALS, AND METHODS OF FORMING

This application claims priority to U.S. Ser. No. 62/131,335, filed Mar. 11, 2015. This prior application is incorporated herein by reference in its entirety.

The present application relates generally to methods of providing texture to polymeric surfaces, and to the resulting textured polymeric materials.

Kassam et al., U.S. Pat. No. 8,119,200, describe a method of imparting texture on an ungelled surface of a non-foamed polymeric material that has been applied to a fabric glove. The method uses the forces applied to the ungelled surface by an aqueous foam solution. In the Kassam process, the surface must be treated, after contacting the foam solution, with an electrolyte solution, which electrolyte will have a gelling action.

Applicants have now discovered that such external foam processes can be greatly simplified by providing a sufficient polymer gelling reagent(s) in the foam treatment step. Applicants have discovered that the variety of textures can be expanded with a number of techniques. For example, the base polymeric material can be foamed. Also, the speed at which the external foam collapses after contacting the polymeric layer affects the surface texture. Further, the time between contacting the external foamy solution and an aqueous washout affects the surface texture.

SUMMARY

Provided in one embodiment is a method of forming texture on polymeric surface comprising: (I) providing a polymeric layer with a first side and a second side, wherein the polymeric layer is made from a polymeric material that gels on contact with a gelling agent, and wherein first side of the polymeric layer is gelled, with gelling extending into the polymeric layer but not to the second side; (II) contacting the second side of the polymeric layer with a foamy aqueous solution of surfactant (one or more), the aqueous foam being in the process of collapsing during the contacting, wherein the aqueous solution of surfactant is effective to gel the polymeric material; (III) applying a aqueous medium to the second surface with sufficient force or agitation so as to remove a portion of the polymeric material; and (IV) curing the remaining polymeric material without, following the contacting step, further contacting the polymer layer with a gelling component.

Also provided is a method of forming texture on polymeric surface comprising: (A) providing a polymeric layer with a first side and a second side, wherein the polymeric layer is made from a polymeric material that gels on contact with a gelling agent, and wherein the first side of the polymeric layer is gelled, with gelling extending into the polymeric layer but not to the second side; (B) contacting the second side of the polymeric layer with a foamy aqueous solution of a cationic surfactant (one or more), the aqueous foam being in the process of collapsing during the contacting, wherein the cationic surfactant is effective in the foamy aqueous solution to gel the polymeric material; (C) applying a aqueous medium to the second surface so as to remove a portion of the polymeric material; and € curing the remaining polymeric material.

DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

An "aqueous medium" is one that is applied with force such as by spraying or dipping with agitation to wash off excess latex and surfactant. Such a solution/medium can for example contain one or more latex gelling agents, such as for example acids or salts. Without being bound by theory, these are believed to facilitate gelling and stabilizing texture formed with the contacting with aqueous foam. In embodiments, applicable to any embodiment described herein, the aqueous medium is not effective to gel the polymeric layer to which it is applied.

"Cationic surfactant" in the foamy aqueous solution is positively charged. Without being bound by theory, it is believed that these attract the negatively charged ions or anionic surfactants normally used as stabilizers in polymer suspension compositions (e.g., latex). A cationic surfactant can be for example a primary amine, secondary amine, tertiary amine, diamine, triamine, quaternary amine, quaternary amine, quaternary ammonia salts, ethoxylated amine, imidazole, a combination thereof, or the like. In a useful embodiment, cationic surfactant is used because it can gel the polymeric layer without the need for supplemental gelling agents.

That the "cationic surfactant is effective in the foamy aqueous solution to gel the polymeric material with contact" means that the cationic surfactant can, and is present in amount effective to, gel the polymer material of the polymeric layer. The use of the cationic surfactant in this amount is applicable to any embodiment described herein (having cationic surfactant, which can be in mixture with non-ionic, amphoteric, or anionic surfactant). Where other components of the foamy aqueous solution can reduce the effectiveness of the cationic surfactant, the amount of cationic surfactant is such that it is effective given the inhibiting components.

A "foamy aqueous solution" is one that will froth on appropriate agitation. In the claimed processes, the solution is frothy during at least a portion of the time that it is contacted with the polymeric layer. Despite the term "solution", non-dissolved components can be present so long as a texture-forming effect results from the foam action of the solution components.

"Gelling" encompasses coagulation. It is the transition of the polymer component from a form that easily washes out with water, to one that adheres to other polymer molecules and resists such wash out.

A "gelling component" as described herein is a material effective to gel a polymeric layer (namely the polymeric layer relevant to the context in which the term is used). If a component has a gelling agent, but not in an amount effective to provide such gelling property to the component, it is not a gelling component.

A "polymeric layer" as described herein can be formed of one, two, or additional dipping steps, as appropriate in the context. If for example, a first applied polymeric layer is allowed to substantially gel, so as for example to provide a fluid impervious layer, that layer will not be deemed part of a polymeric layer that is subject to the formation of texture with the external foaming process described herein. Polymeric compositions can be elastomeric. Prior to gelling, polymeric compositions can be latex compositions.

In embodiments, the polymeric compositions can be stabilized with cationic surfactant, and the foamy aqueous solution can utilize an anionic surfactant to gel in the absence or reduced presence of other gelling agents.

The polymeric layers (e.g., support or texture layers) may be natural rubber latex (including Guayule latex), synthetic latex, or the like, and combinations thereof. The synthetic latex may be selected, for example, from the group comprised of polychloroprene, acrylonitrile butadiene copolymer (NBR) (such as carboxylated acrylonitrile butadiene copolymer, such as highly carboxylated acrylonitrile butadiene copolymer), polyisoprene, polyurethane (PU), styrene-butadiene, butyl, and combinations thereof. For the texture-forming layer, NBR (i.e., nitrile), polyurethane or a mixture thereof can be useful. For example, a latex can be used wherein the polymer component is about 95% to about 100% wt. NBR, with the major part of the residual polymer component (if any) being PU. In such embodiments with PU, the PU component can be for example about 1 to about 5% wt. of the polymer components. A useful polyurethane is polyester based (e.g., WPU-70-18AW polyurethane, obtainable from Taiwan PU Corporation).

In embodiments, polymeric particle compositions may have commonly used stabilizers such as potassium hydroxide, ammonia, sodium salts, ethoxylated nonphenol, ethoxylated tridecyl alcohol, sulfonates and the like. In embodiments, the polymeric particle compositions may contain other commonly used ingredients such as surfactants, antimicrobial agents, fillers/additives and the like. In embodiments, the polymeric particle compositions used to form the polymeric layer has a viscosity in the range of for example about 500-8000 centipoises, such as about 1000-5000 centipoises.

Embodiments according to the invention further include in the polymeric layer vulcanizing agents and activators, such as zinc oxide, zinc diethyl dithiocarbamate (ZDEC), sulphur or thickeners, such as Rohagit SD-15 thickener (based on an aqueous dispersion of a thermoplastic methacrylic acid-acrylic ester copolymer, from Synthomer LLC, Atlanta, Ga.), Acrysol G111 thickener (neutralized polyacrylatem Dow), MHPC 50 thickener (nonionic cellulose ether, Ashland Inc., Covington, Ky.), PVA 117 thickener (Kuraray Co., Ltd., Osaka, JP) as are known to those of skill in the art. Particle fillers, i.e., reinforcement fillers, such as boron carbide and/or silicon carbide and/or, aluminum potassium silicates, such as mica, and/or aluminum oxide may be employed to improve the abrasion resistance of coatings formed from the polymeric compositions.

Foamed or unfoamed polymeric layers can be used in the texture-providing layers. Foam polymer formulations can comprise elastomer, stabilizer, curative agent, and optionally foaming agent, one or more of thickening agent (e.g., MHPC), flow modifier, pigment(s), and the like. Wax or filler additives may be added. For a foamed polymeric layer, the air content in the composition can be for example in the 5 to 50% range on a volume basis. Once a composition is foamed with the desired air content and the viscosity is adjusted as appropriate, refinement of the foamed composition can be undertaken by stirring the composition with an impeller driven at a fast speed and using a different impeller run at a reduced speed to refine the bubble size as is known to those of skill in the art. Methods for incorporating high air contents are described in Woodford et al., U.S. Pat. No. 7,048,884, which is commonly-assigned and incorporated herein in its entirety.

Foamed or unfoamed polymeric compositions having higher viscosity may not penetrate the interstices between the yarns in the knitted liner and, if so applied, may require a higher depth of immersion of a former having a dressed knitted liner. Also, the air cells can reduce the modulus of elasticity of the coating made from the polymeric composition, increasing the flexibility of the glove. The air content in the range of 5-15 volumetric percent results in foams that have closed cells, creating a foamed coating that is liquid impervious and has a spongy, soft feel. Unfoamed polymeric compositions (0% air content) is used for example to create a texturized coating which is also impermeable to oil and water.

Some air cells, whether an open-celled or close-celled foam may be disposed on the external surface of the coating, providing increased roughness and have the ability to remove boundary layer of oil and water from a gripping surface, providing increased grip properties. If the volumetric air content is in the range of 15-50% in a foamed coating on a liner, the air cells are adjacent to each other and expand during a vulcanization heating step and touch each other, and merge. This process creates open-celled foams having an intra-foam network of cells in fluid communication with each other. Therefore, open-celled foams absorb liquids, such as oils and water, into an internal matrix. For example, if a drop of liquid is placed on a glove in the palm portion, the liquid penetrates the polymeric coating cells, as opposed to a closed-celled foam, which is impervious to liquids.

In embodiments, coagulant solution (e.g., 2-10 wt % calcium nitrate solution) is applied to the former or support article and dried prior to application of an elastomeric layer.

When applying an polymeric layer, a gellied coagulant can be used to act as an adhesive for the latex to adhere to the former. The gellied coagulant can contain for example calcium nitrate, wetting agent (alcohol ethoxylate and/or alkylarylalkoxylate), acids, cellulosic thickener, water-based defoamer and water. The formulation can be designed to have wetting agent(s) in order to have optimum former wetness to minimize potential of major defects such as holes and thin spots. The defoamer(s) function as bubble inhibitors (in the interior portion of layer that remains in embodiments relatively untextured (solid)).

Generally, for the polymeric layers on which texture is to be formed with the methods of the invention, a rougher texture is often formed when the layer is formed by a single dipping step. A relatively smoother texture is often formed with a layer formed by a double dipping process.

As discussed above, a variable that can be used to modify the type of texture obtained is the speed that the foam of the foamy aqueous solution collapses or so-called "internal rate of foamy aqueous solution collapses" causing physical reaction between latex coating & foamy aqueous solution upon contact. The speed of collapse can be measured by stopwatch. The collapsing time is in the range of 1-10 minutes, depending on the traveling time between contacting with foamy aqueous solution and applying aqueous medium.

Generally, with a longer the delay time between contacting with foamy aqueous solution and applying a aqueous medium (e.g. 6-10 minutes), the coating texture is deeper with smaller bubbles on the coating surface. If the delay is shorter (e.g. 1-2 minutes), generally the texture is shallower and relatively more bubbles on the surface.

Generally, stirrers are used to create the foam in the foamy aqueous solution. For example, stirrers can be located at the end compartment or the bottom of a tank. The formers are dipped into the tank after the foaming process.

Where the process uses a cationic surfactant to form the foamy aqueous solution, the cationic surfactant can be necessary to the gelling action in the foamy aqueous solution. That is to say that any other components that might have gelling action are not present in an amount sufficient to be effective in a commercially viable process absent the cationic surfactant. Also where the process uses a cationic surfactant to form the foamy aqueous solution, the cationic surfactant can comprise substantially all of the components with gelling action in the foamy aqueous solution. That is to say that the concentration all other components that have gelling action would have to be doubled in a commercially viable process to have gelling action absent the cationic surfactant. In the reaction process, the cationic surfactant can effectively gel the polymeric material and enable fast texturization process to take place without the use of any gelling agent (other than surfactant).

The amount of ungelled polymer left on the article can affect texture formed. For example, the higher amount of ungelled polymer depending on the latex gelling time and pick-up timing can result in relatively rough, deep texture, characterized by irregular surface shapes. The lower amount of ungelled latex left on the knitted liner after the application of the foamy aqueous solution and aqueous medium can result in a finer, more shallow and more rounded surface topology. With spraying processes for applying aqueous medium, for example, the aqueous medium application can be measured by water flow rate and numbers of nozzles per spraying equipment.

In embodiments that remove a lesser amount of polymer, between about 10% and about 30% by weight of the polymer molecules applied to the texture-forming polymeric layer are removed by the aqueous medium. In embodiments that remove a greater amount of polymer, between about 30% and about 50% by weight of the polymer molecules applied to the texture-forming polymeric layer are removed by the aqueous medium.

Figure 2A:
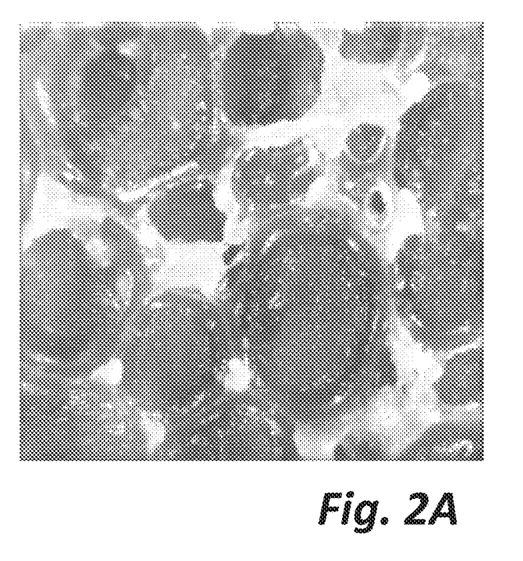
FIGS. 2A and 2B compare the process results where the external foamy aqueous solution lacks (2A) or further comprises (2B) metal salt components.
Figure 2B:
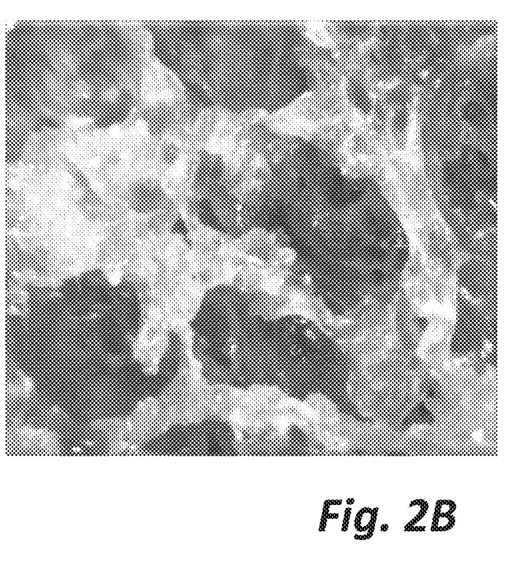

In embodiments, the external foamy aqueous solution further comprises additional salt components (such as metal salt components). For example, it can be formulated in sea water. FIG. 2A shows the texture where a cationic surfactant (Algene 40) is used without salt. FIG. 2B shows the texture where a cationic surfactant (Algene 40) is used with salt (in the exemplification: the surfactant dissolved in sea water). With salt the indentations (indentations are darker in the figure) are more irregular and deeper. Without being bound by theory, it is believed that the irregular deep texture can be achieved with other surfactants. FIG. 2A shows indentations of individual average diameter (taking into account oval or other shape irregularities) in the range of about 0.14 mm to about 0.80 mm. FIG. 2B shows indentations of individual average diameter in the range of about 0.14 mm to about 0.90 mm.

Where there is added salt, preferably the conductivity of the aqueous medium can be for example from about 0.01 S/cm to about 0.06 S/cm.

Figure 3A:
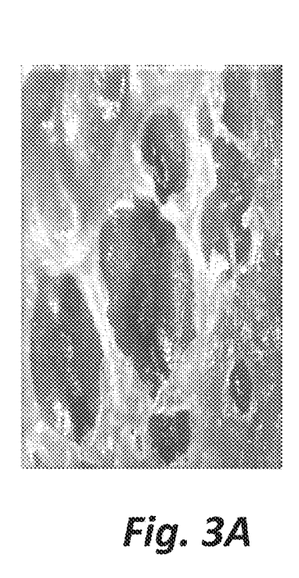
FIGS. 3A to 3C compare the process results using amphoteric surfactant (3A), anionic surfactant (3B) and cationic surfactant (3C)
Figure 3B:
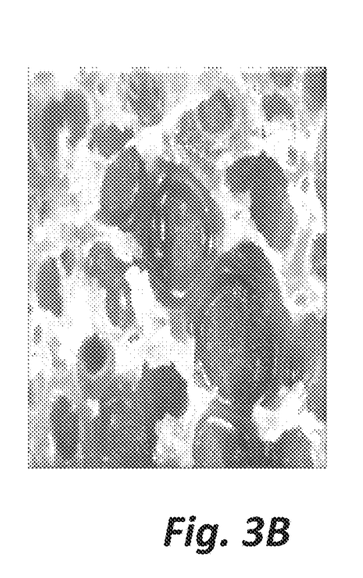
Figure 3C:
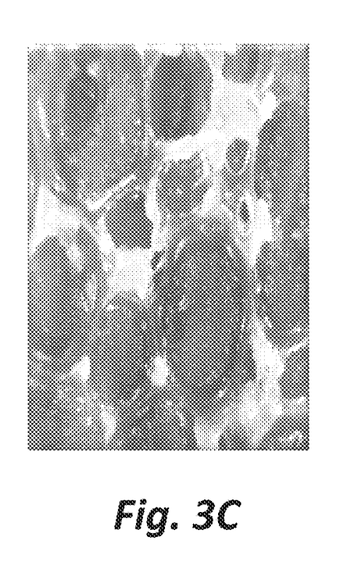

FIG. 3A shows the texture where an amphoteric surfactant (Betaine) is used (see exemplary formulation below). FIG. 3B shows the texture where an anionic surfactant (Dowfax) is used (see exemplary formulation below). FIG. 3C shows the texture where a cationic surfactant (Algene 40) is used without salt (see exemplary formulation below). Compared with cationic, the texture in FIG. 3A is deeper and irregular. The texture in FIG. 3B is shallower than with cationic, more irregular than with cationic, and not as irregular as with amphoteric surfactant. FIG. 3A shows indentations of individual average diameter in the range of about 0.14 mm to about 0.60 mm; FIG. 3B in the range of about 0.10 mm to about 0.84 mm; FIG. 3C in the range of about 0.14 mm to about 1.0 mm.

Figure 4A:
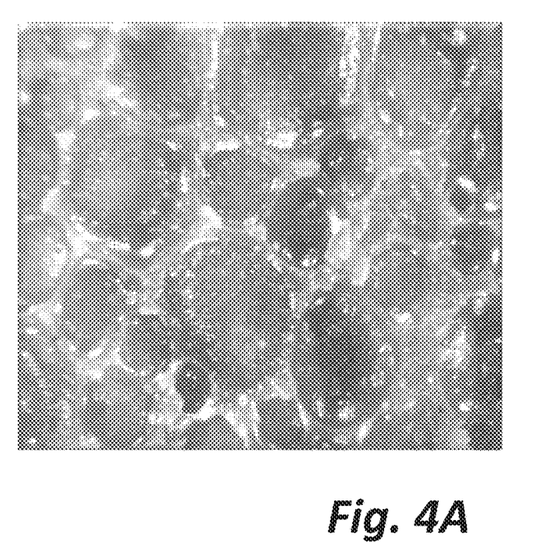
FIGS. 4A and 4B compare the process results where a shorter (4A) or longer (4B) delay between the two aqueous treatments is used.
Figure 4B:
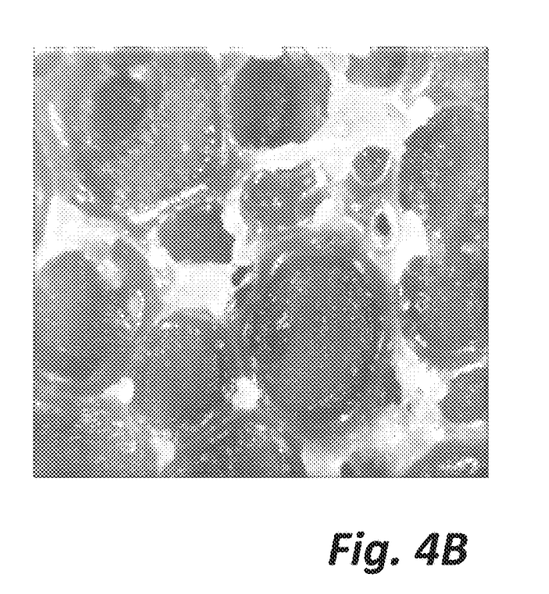

Thus, parameters that can be varied to vary the texture of the surface include:

Selecting the type of surfactant;

Selecting the temperature of the foamy aqueous solution of surfactant (such as from about 30° C. to about 80° C.);

Selecting the aqueous solvent for the surfactant (such as including or not a metal salt component);

Selecting the delay time between contacting (i.e., withdrawing the polymer from the contacting solution) with the foamy aqueous solution and applying a aqueous medium (such as by spraying). Generally, shorter delay times (such as 1 min.) result in relatively more indentations and shallower texture, and longer delay times (such as 6 to 10 min) result in relatively fewer indentations, and deeper texture. Compare FIG. 4A (1 min.) with FIG. 4B (~6-10 min.) (quaternary surfactant used to make both textures). (FIG. 4A shows indentations of individual average diameter in the range of about 0.10 mm to about 0.20 mm; FIG. 4B in the range of about 0.50 mm to about 0.80 mm.)

Figure 5A:
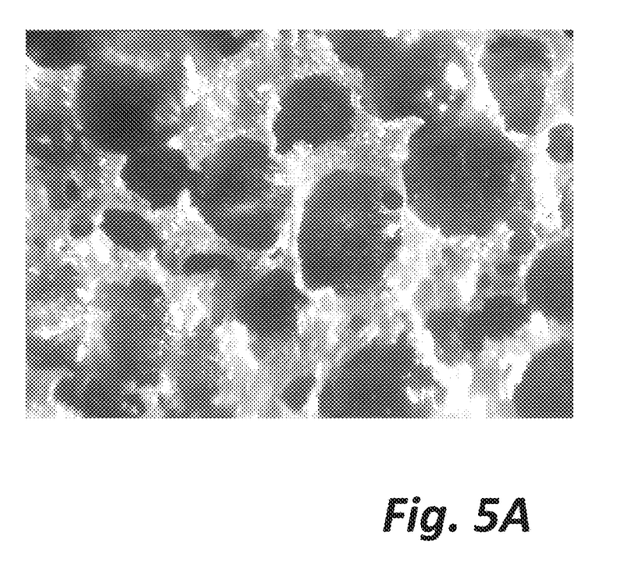
FIGS. 5A and 5B compare the process results where relatively less (5A) and relatively more (5B) ungelled polymer is present before contacting with the foamy aqueous solution.

Selecting for example (a) coagulant, (b) coagulant loading, (c) polymer latex stability or (d) the delay time between polymer application and contacting with the foamy aqueous solution, so as to modify the amount of ungelled latex present during the contacting with the foamy aqueous solution. Generally, higher amounts of ungelled polymer results in rougher, deeper texture, while lower amounts result in finer, shallower texture. Generally, higher amounts of ungelled polymer results in indentations with more irregular shape, while lower amounts result in rounder indentations. Compare FIG. 5A (relatively less ungelled polymer) with FIG. 5B (relatively more ungelled polymer) (quaternary surfactant used to make both textures). (FIG. 5A shows indentations of individual average diameter in the range of about 0.30 mm to about 0.60 mm; FIG. 4B in the range of about 0.30 mm to about 2.0 mm.)

The contacting step is ended by removing the polymeric layer from the foamy aqueous solution (including the foam that may be on top). This is so even though the removed polymeric layer may carry some of the solution with it.

In certain embodiments, the amount of time between contacting step and the applying step is between about 0.1 and about 3 minutes. In certain embodiments, the amount of time between contacting step and the applying step is between about 4 and about 20 minutes.

In certain single dip embodiments, the amount of polymer removed by the contacting and aqueous medium application steps is from about 5% wt to about 35%. In single certain dip embodiments, the amount of polymer removed is from about 35% wt to about 55%. The amount can be measured by comparing dry weight of the product with the two steps applied, to that with the step omitted. If the article is supported, the support weight is deducted from both measurements.

In multiple dip embodiments, those of skill will recognize which layers are adapted to be stable to the contacting and aqueous medium application steps. The weight of these stable layers and any support is deducted from the removal percentage calculation. In certain such embodiments, the removal percentage of the susceptible layers is as described in one of the above ranges.

In embodiments, the process is used to make interior or exterior surfaces for wearable articles, such as gloves, booties, elbow or knee guards, condoms, and the like. The textured polymeric layer can be applied directly of via intermediate polymer to a fabric, such as a knitted, woven or non-woven fabric. In embodiments the articles are formed of polymeric layers (i.e., without fabric).

A common use of the process is to provide grip texture on the exterior of an article. Another use is to enhance oil or water absorption of open foam polymeric materials. This use can be on the exterior, to help preserve grip in the presence of water or oil, or on the interior to aid in moisture management. Grip on the interior may be important in some contexts, such as to limit slippage of elbow or knee guards.

Figure 1A:
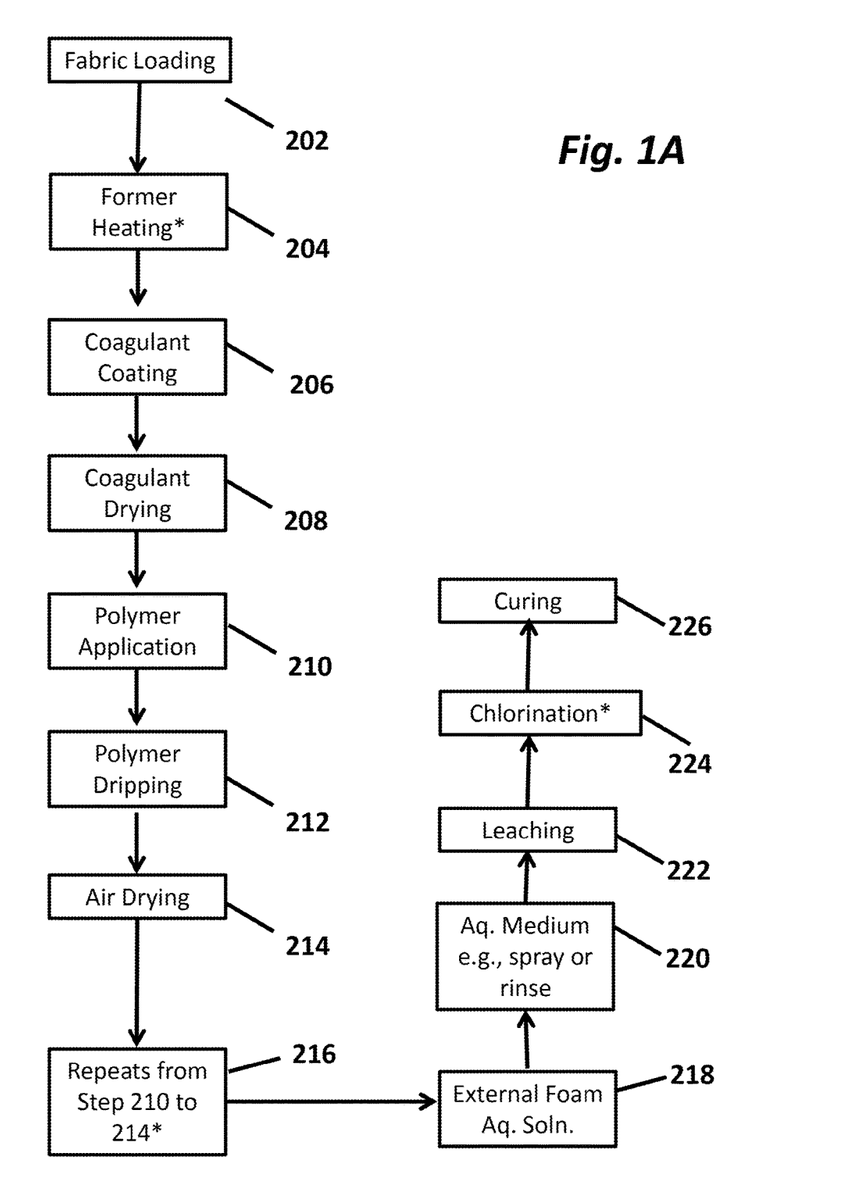
FIG. 1A depicts a process of making the textured surface of the invention (for supported articles)

As exemplified in FIG. 1A, a dipping former (typically cleaned) has a fabric loaded thereon (Step 202). In embodiments, the former already has fabric with laminated polymer adhered, and at least one further laminated layer of polymer is applied per an iteration of step 210. A laminate is a bonding, fusing, adhesion, or the like between polymer layers, or between polymer and fabric layers, such that in the range of anticipated use the laminate is a unitary structure.

In Step 204, the former is heated (the asterisk here and elsewhere in the figure denoting an optional step). In Step 206, a coagulant composition is applied. In Step 208, the coagulant composition is dried. In Step 210, polymer is applied. In Steps 212 and 214, the former is removed from the polymer composition for dripping (can be upward and/or downward) and air drying (can be upward and/or downward). In Step 216, polymer application is repeated (Step 210) one or more times, also repeating in order as appropriate to the process Steps 210, 212 and 214 (optionally repeating coagulant coating as well). In Step 218, the polymer coating is contacted with external foamy aqueous solution. For this step, the solution can be agitated or otherwise aerated to reduce density to an appropriate amount, such as about 90%. In Step 220, the aqueous medium is applied. In Step 222, the article is leached. In Step 224, the exterior polymer layer is chlorinated. (In practice, those steps marked with an asterisk are conducted or not as a design choice.) In Step 226, the polymeric layer is cured. Typically, an article comprising the polymeric layer is stripped from the former for packaging or use.

Figure 1B:
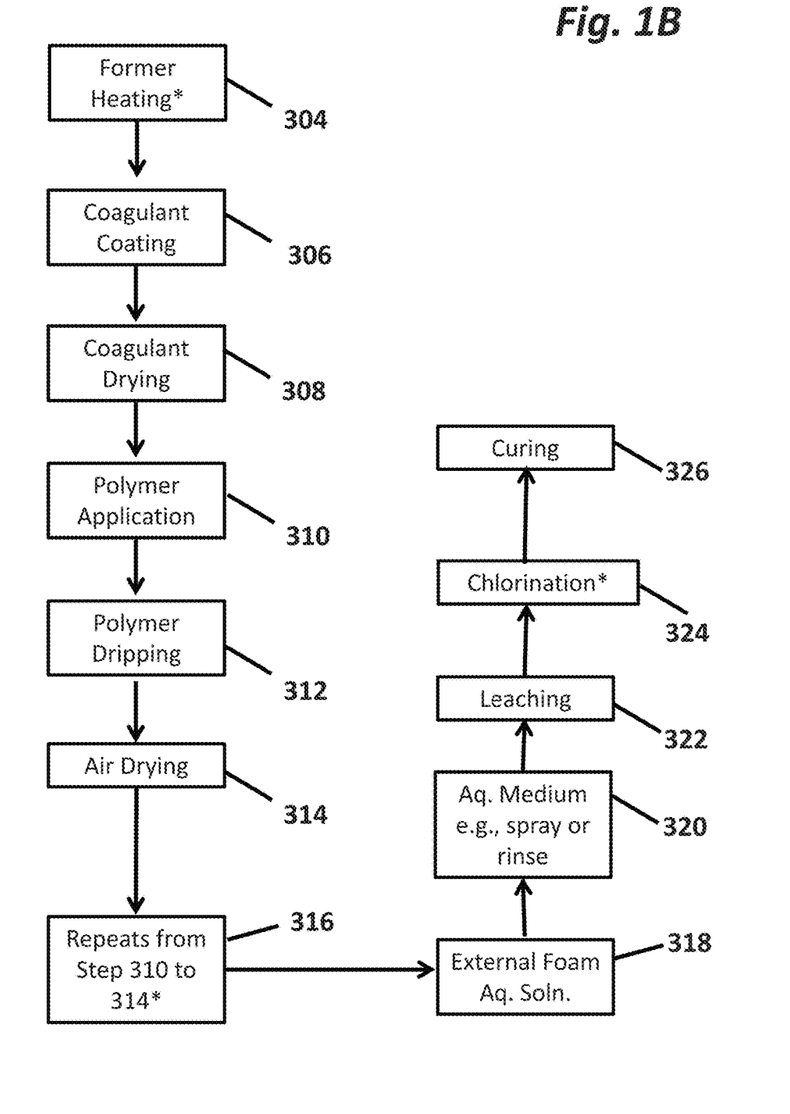
FIG. 1B depicts a process of making the textured surface of the invention (for unsupported articles)

The process for an unsupported glove is set forth in FIG. 1B. The numbering corresponds to the numbering above, except that the step 204 is now step 304 (+100), etc. (There is no analog of step 202.) In embodiments, the former already has polymer adhered, and at least one further layer of polymer is applied per an iteration of step 310. Steps 324 and 326 can be, and preferably are, reversed.

While many of the steps in FIGS. 1A and 1B are nearly always done (unless marked with an asterisk), the invention involves: a polymer layer to which coagulation is occurring from the underside; contacting the topside with the foamy aqueous solution; and contacting the topside with the aqueous medium.

The surfactant components in the external foam can be for example anionic, amphoteric, non-ionic or cationic surfactants, or mixtures thereof. Anionic surfactant can be for example Dowfax 2A1 (Alkyldiphenyloxide Disulfonate, Dow Chemical, Newark, Del.), Empimin OT 75 (dioctyl sodium sulfosuccinate, Hunstman Holland), or a mixture thereof. For example, the anionic surfactant treated glove has shallow texturization with irregular bubbles shape. Amphoteric surfactant can be, for example, sulfamic acid, amino propionic acids, or a mixture thereof. For example, the amphoteric surfactant treated glove has deep texturization with irregular bubbles shape. Non-ionic surfactant can be, for example, Surfynol 465 (Ethoxylated acetylenic diols, Air Products), ZetaSperse 179 (Ethoxylated alcohols, Air Products), Teric 168 (Fatty alcohol—alkylene oxide copolymer, Hunstman), or a mixture thereof. Cationic surfactant can be for example, Triameen Y12D-30 (Dodecyl dipropylenetriamine, Akzo Nobel), Triameen T (N-tallowalkyl dipropylene triamine, Akzo Nobel), Duomeen (Oleylpropylenediamine, Akzo Nobel), Redicote 103 (mixture of N-Tallow-1,3-diaminopropane and (Hydrogenated tallow) amine, Akzo Nobel), Berol 1250 (Tallow alkylamine, Akzo Nobel), Fentacare T05 (Ethoxylated tallow alkyl amine, Solvay), Servamine Koo 360 (Oleic acid & diethylenetriamine, Elementis) or a mixture thereof.

Specific embodiments according to the methods of the present invention will now be described in the following examples. The examples are illustrative only, and are not intended to limit the remainder of the disclosure in any way.

Articles with textured surfaces that can be made with the methods of the invention include for example, gloves, foot coverings (e.g., booties, such as surgical booties), finger cots, condoms, coverings for objects that are gripped, carpet grips, and the like.

In embodiments, the oil grip force for gloves made according to the invention (with finger tips textured per the invention) is about 5.01 kgf or less with at 6.5 kg challenge. In embodiments, the oil grip force for gloves made according to the invention is about 2.62 kgf or less with at 4.5 kg challenge. In embodiments, the oil grip force for gloves made according to the invention is about 1.27 kgf or less with at 2.5 kg challenge. In embodiments, the surface on another article that is not such a glove is made by a method that would provide such oil grip, and has substantially corresponding surface topology.

Figure 5B:
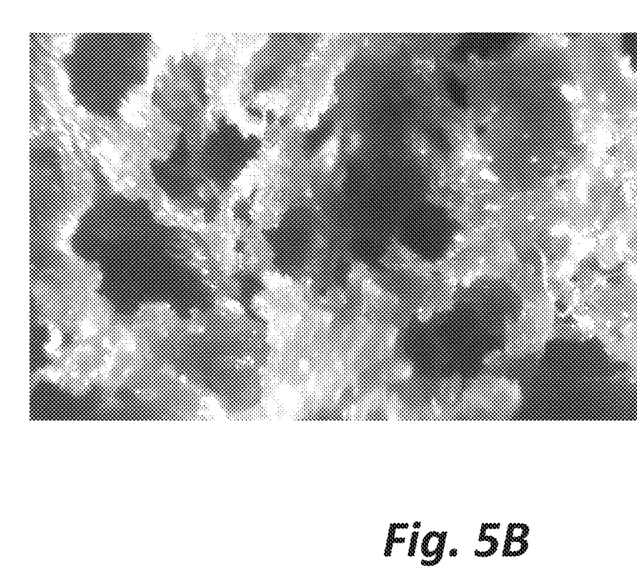

In certain embodiments, the indentations are of individual average diameter of about 0.15 mm to about 2.2 mm, with a disperse range of diameters, and with an irregular, bulbous shape to the majority of the indentation boundaries (see FIG. 5B). This sizing means that for a representative area including 200 indentations, 80% are in the size range. A disperse range means that in the representative area 25% or more of indentations are 40% of the mean diameter or less, and 25% or more of indentations are 60% of the mean diameter or more.

Principle of the Test Method

A test bar with internal sensors that detect grip force (units in kgf) is connected at one end by a cable that passes over and is suspended from an overhead pulley and then connects down to a bucket container on the floor. The bucket is filled with water to provide a certain load of 2.5 kg, 4.5 kg or 6.5 kg. A tester wearing a glove specimen grasps a test bar to provide a minimal force to secure contact and grip so that a certain load (2.5 kg, 4.5 kg & 6.5 kg) can be lifted. The grip force applied on the test bar is then displayed on the digital indicator. The test bar and gloves are covered with water or oil when performing wet and oil grip test, respectively. The wet grip test differs from the oil grip test only in substituting water for the oil. The oil used is Shell Rimula X 15W-40 (Shell Oil Co.), with a dynamic viscosity at −20° C. of 6600 mPa.

TABLE

Test Procedure for Oil Grip

| | |
|---|---|
| a) | A bucket is placed on a 30 kg balance and filled with tap water to provide a weight of 2.5 kg. |
| b) | 5 ml of Shell Rimula X 15W-40 is used to apply on the glove specimen. |
| c) | The test bar is then covered with Shell Rimula X 15W-40 by rubbing it with the test glove specimen which has early wetted. |
| d) | The tester uses ideally the same hand to grasp the test bar wearing the test glove specimen. |
| e) | The gloved hand applies just sufficient grip force to the test bar to provide secure contact and grip so that with a downward movement of the tester's arm the weight could be lifted. |
| f) | The grip force (in kgf) applied on the test bar is then displayed on the Digital Indicator in two decimal places. |
| g) | The tester shall try several attempts to lift up a certain load and observe any penetration of Shell Rimula X 15W-40 into the tester's hand. |
| h) | The bucket is placed on a 30 kg balance and filled with tap water to provide a weight of 4.5 kg. |
| i) | Repeat steps 5.7.2 (C) b)-g) for lifting up the load of 4.5 kg. |
| j) | The bucket is placed on a 30 kg balance and filled with tap water to provide a weight of 6.5 kg. |
| k) | Repeat steps 5.7.2 (C) b)-g) for lifting up the load of 6.5 kg. |

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

Where a sentence states that its subject is found in embodiments, or in certain embodiments, or in the like, it is applicable to any embodiment in which the subject matter can be logically applied.

EXAMPLE 1

Exemplary components, and exemplary amounts for the foamy aqueous solution of surfactant include:

TABLE 5

| Type of component | Component used | Composition (% by weight) |
|---|---|---|
| Cationic surfactant or blend of various type of surfactants | Dodecyl dipropylenetriamine/ N-tallowalkyl dipropylene triamine/ Oleylpropylenediamine/Mixture of N-Tallow-1,3-diaminopropane and (Hydrogenated tallow) amine/Tallow alkylamine/Ethoxylated tallow alkyl amine/Oleic acid & diethylenetriamine/ Alkyldiphenyloxide disulfonate/ Dioctyl sodium sulfosuccinate/ Sulfamic acid/Amino propionic acids/Ethoxylated acetylenic diols/ Ethoxylated alcohols/Fatty alcohol-alkylene oxide copolymer | 0.1-5.0 |
| Coagulant (Optional) | Combination of one or more of Calcium nitrate/Calcium chloride/ Sodium chloride/potassium hydroxide/ammonia | 0.05-10.0 |
| Acid (Optional) | Combination of one or more of Phosphoric acid/hydrochloric acid | 0.1-2.0 |
| Water | Water | 95.0-99.90 |

The foamy aqueous solution of surfactant can be agitated to reduce density to, for example, about 90%, and used immediately thereafter to contact the polymeric layer.

For amphoteric surfactant, an exemplary formulation is:

| TSC (%) | Ingredients | Dry (phr) | Wet (kg) | Actual (kg) |
|---|---|---|---|---|
| 0 | Water | 0.0 | 94.09 | 14.11 |
| 42.5 | Phosphoric acid | 0.30 | 0.71 | 0.106 |
| 100 | Acetic acid | 0.24 | 0.24 | 0.04 |
| 30 | Betaine | 0.08 | 0.27 | 0.04 |
| 100 | Sodium Chloride | 4.70 | 4.70 | 0.71 |
| | Total | 5.32 | 100.00 | 15.00 |

For anionic surfactant, an exemplary formulation is:

| TSC (%) | Ingredients | Dry (phr) | Wet (kg) | Actual (kg) |
|---|---|---|---|---|
| 0 | Water | 0.0 | 92.29 | 13.84 |
| 42.5 | Phosphoric acid | 0.30 | 0.71 | 0.106 |
| 100 | Acetic acid | 0.24 | 0.24 | 0.04 |
| 7.74 | Dowfax 2A1 solution | 0.16 | 2.07 | 0.31 |
| 100 | Sodium Chloride | 4.70 | 4.70 | 0.71 |
| | Total | 5.40 | 100.00 | 15.00 |

For cationic surfactant, an exemplary formulation is:

| TSC (%) | Ingredients | Dry (phr) | Wet (kg) |
|---|---|---|---|
| 0 | Water | 0.0 | 97.50 |
| 40 | Algene N40 | 1.00 | 2.50 |
| | Total | 1.00 | 100.00 |

For cationic surfactant, an exemplary formulation is:

| TSC (%) | Ingredients | Dry (phr) | Wet (kg) |
|---|---|---|---|
| 0 | Water | 0 | 96.67 |
| 30 | Triameen Y12D-30 | 1 | 3.33 |
| | Total | 1 | 100 |

Numbered Embodiments

The invention can be further described with reference to the following Embodiments:

Embodiment 1. A method of forming texture on polymeric surface comprising: (I) providing a polymeric layer with a first side and a second side, wherein the polymeric layer is made from a polymeric material that gels on contact with a gelling agent, and wherein the first side of the polymeric layer is gelled, with gelling extending into the polymeric layer but not to the second side; (II) contacting the second side of the polymeric layer with a foamy aqueous solution of surfactant (one or more), the aqueous foam being in the process of collapsing during the contacting, wherein the aqueous solution of surfactant is effective to gel the polymeric material; (III) applying a aqueous medium to the second surface with sufficient force or agitation so as to remove a portion of the polymeric material; and (IV) curing the remaining polymeric material without, following the contacting step, further contacting the polymer layer with a gelling component.

Embodiment 2. A method of forming texture on polymeric surface comprising: (A) providing a polymeric layer with a first side and a second side, wherein the polymeric layer is made from a polymeric material that gels on contact with a gelling agent, and wherein the first side of the polymeric layer is gelled, with gelling extending into the polymeric layer but not to the second side; (B) contacting the second side of the polymeric layer with a foamy aqueous solution of a cationic surfactant (one or more), the aqueous foam being in the process of collapsing during the contacting, wherein the cationic surfactant is effective in the foamy aqueous solution to gel the polymeric material; (C) applying a aqueous medium to the second surface so as to remove a portion of the polymeric material; and (D) curing the remaining polymeric material.

Embodiment 3. The method of one of the foregoing Embodiments, wherein the foamy aqueous solution would be, in the absence of the surfactant, ineffective to so gel.

Embodiment 4. The method of one of the foregoing Embodiments, wherein the aqueous medium is applied by spraying.

Embodiment 5. The method of one of the foregoing Embodiments, wherein the foamy aqueous solution comprises an amphoteric surfactant.

Embodiment 6. The method of one of the foregoing Embodiments, wherein the foamy aqueous solution comprises an anionic surfactant.

Embodiment 7. The method of one of the foregoing Embodiments, wherein the foamy aqueous solution has conductivity from about 0.01 S/cm to about 0.06 S/cm (wherein at least at the higher end of this range Embodiment 3 is less likely to apply).

Embodiment 8. The method of one of the foregoing Embodiments, wherein an amount polymer of susceptible layers removed by the contacting and aqueous medium application steps is from about 5% wt to about 35%.

Embodiment 9. The method of one of the foregoing Embodiments, wherein an amount polymer of susceptible layers removed by the contacting and aqueous medium application steps is from about 35% wt to about 55%.

Embodiment 10. The method of one of the foregoing Embodiments, wherein an amount of time between contacting step and the applying step is between about 0.1 and about 3 minutes.

Embodiment 11. The method of one of the foregoing Embodiments, wherein an amount of time between contacting step and the applying step is between about 4 and about 20 minutes.

Embodiment 12. A method of forming texture of one of the foregoing Embodiments, wherein the curing is conducted without, following the contacting step, further contacting the second side of the polymer layer with a gelling component.

Embodiment 13. The method of one of the foregoing Embodiments, wherein the first side of the polymeric layer is directly, or via one or more polymeric layers, laminated to a fabric liner.

This invention described herein is of a textured glove and methods of forming the same. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. A method of forming texture on a polymeric surface comprising:

providing a polymeric layer with a first side and a second side, wherein the polymeric layer is made from a polymeric material that gels on contact with a gelling agent, and wherein the first side of the polymeric layer is gelled, with gelling extending into the polymeric layer but not to the second side;

contacting the second side of the polymeric layer with a foamy aqueous solution of surfactant, foam of the foamy aqueous solution being in the process of collapsing during the contacting, wherein the foamy aqueous solution of surfactant is effective to coagulate the polymeric material;

thereafter applying an aqueous medium to the second side with force or agitation effective to remove a portion of the polymeric material leaving a remaining polymeric material;

thereafter curing the remaining polymeric material without, following the contacting step, further contacting the polymer layer with a coagulating component; and obtaining, after the curing step, a polymeric surface on the polymeric layer that has a different texture than would have been obtained absent the contacting step.

2. The method of claim 1, wherein the aqueous medium is applied by spraying effective to remove said portion of polymeric material.

3. The method of claim 1, wherein the foamy aqueous solution comprises an amphoteric surfactant.

4. The method of claim 1, wherein the foamy aqueous solution comprises an anionic surfactant.

5. The method of claim 1, wherein the foamy aqueous solution has electrical conductivity from about 0.01 S/cm to about 0.06 S/cm.

6. The method of claim 1, wherein an amount polymer removed by the contacting and aqueous medium application steps is from about 5% wt to about 35%.

7. The method of claim 1, wherein an amount polymer removed by the contacting and aqueous medium application steps is from about 35% wt to about 55%.

8. The method of claim 1, wherein an amount of time between the contacting step and the applying step is between about 0.1 and about 3 minutes.

9. The method of claim 1, wherein an amount of time between the contacting step and the applying step is between about 4 and about 20 minutes.

10. The method of claim 1, wherein the foamy aqueous solution comprises a cationic surfactant.

* * * * *